(No Model.)

H. A. ALDEN.
HORSE HAY RAKE.

No. 338,460.  Patented Mar. 23, 1886.

Witnesses;
Edward P. Brooks
H. W. Wells

Inventor,
Horace A. Alden,
per A. B. Upham,
His Attorney.

United States Patent Office.

HORACE A. ALDEN, OF PEORIA, ILLINOIS, ASSIGNOR TO THE ACME HAY HARVESTER COMPANY, OF SAME PLACE.

HORSE HAY-RAKE.

SPECIFICATION forming part of Letters Patent No. 338,460, dated March 23, 1886.

Application filed June 1, 1885. Serial No. 167,333. (No model.)

*To all whom it may concern:*

Be it known that I, HORACE A. ALDEN, of Peoria, in the county of Peoria, in the State of Illinois, have invented an Improved Horse Hay-Rake; and I do hereby declare that the following is a full, clear, and exact description thereof, reference being had to the annexed drawings, making a part of this specification, in which like letters of reference refer to like parts, and in which—

Figure 2:
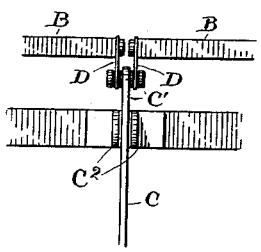
Figure 3:
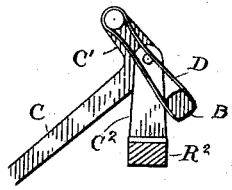
Figure 4:
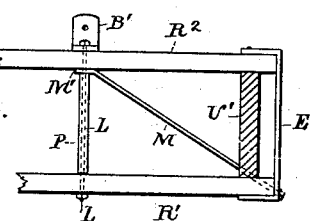
Figure 1:
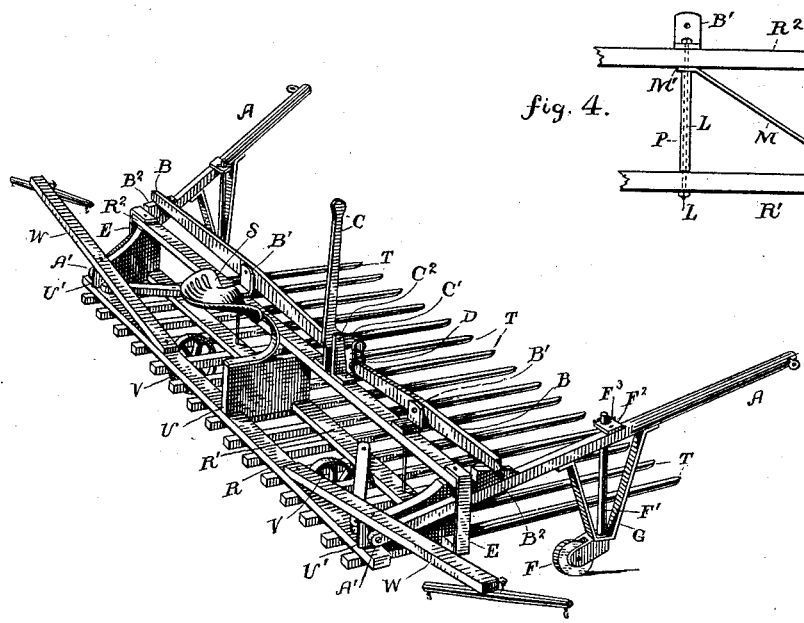

Figure 1 represents a perspective view of the same; Figs. 2, 3, and 4 views of details of the rake.

This invention of the class of horse hay-rakes used for collecting and delivering hay to the stackers is more particularly of the kind which is provided at each end with a horizontally-rigid tongue for the attachment of the horses; and my invention relates, especially, to an improved means for raising the rake-teeth free of the ground, and also to means whereby the weight of the tongues and that of the rake suspended therefrom is supported independent of the horses.

In my hay-rake the tongues are pivotally attached with a limited vertical play to the ends of the rake-frame, and the mechanism which I have devised for elevating the front ends of the rake-teeth and suspending the same from said tongues consists of levers connected to said frame and tongues, and having means for operating and locking them, whereby the relative angular position of the tongues and teeth are so changed that the latter are given the desired elevation. Since by such construction the weight of the raised front portion of the rake-teeth is sustained by the tongues, it becomes desirable to provide some auxiliary support to relieve the horses of their otherwise heavy burden. For this purpose I have arranged for each tongue a caster-wheel adapted to sustain said tongues, and also by their swivel-attachment to permit the rake to be backed or turned at any angle without hinderance.

In the drawings, T T, &c., indicate the rake-teeth rigidly fastened at their rear ends to the frame-beams R R'. By the blocks U' U U' a third beam, R², is fixed above and parallel to said beam R'. Upon the middle block, U, is the driver's seat S, and prolonged beyond the ends of the frame-beam R are the draft-bars W, to which the horses are attached. The tongues, or "backing-poles," as they are often termed, are pivoted at their rear ends, A', to the blocks U', against the outer faces of which they are kept in contact by the straps E, fastened at their ends to the projecting extremities of the frame-beams R' R². By means of said pivots and straps said tongues A are enabled to be vertically oscillated through a limited arc.

To decrease the horizontal angle of divergence between the tongues A and rake-teeth T, and thereby elevate said teeth, is the object of the following-described construction, in which B B are the levers previously mentioned. Said levers B are each pivoted at or near their longitudinal centers to the angle-irons B', fast upon the frame-beam R², and the outer ends thereof rest upon the tongues A or upon the blocks B², fixed to said tongues. The elbow-lever C, pivoted to the bearing-irons C², projecting rigidly from said beam R², has its short arm C' connected to the inner ends of the levers B by the links D. By oscillating said elbow-lever C backward, its short arm C' rises and elevates with it the inner ends of the levers B. If, now, the tongues A are fixedly supported, the blocks B² become the fulcrums of the said levers, the angle-irons B' supporting the rake-frame are the points of suspension of the weights, and the inner ends of said levers are the points of application of power thereto. Hence, as the inner ends of said levers are raised their centers rise also, and the forward ends of the rake-teeth are elevated. The elbow-lever C being turned backward until the short arm thereof is past the pivotal center, the downward pull of the levers and connecting-links is unavailing to return the elbow-lever, and the rake-teeth are therefore locked in their elevated position. Fig. 3 shows the relative positions of the links D and elbow-lever C when locked.

The rear portion of the rake is supported by the wheels V, having suitable bearings between the beams R R'.

F F are the caster-wheels for supporting the tongues A. Each of said caster-wheels is mounted in the bifurcated deflected lower end of the vertical swivel-shaft F', having its upper end held by the bearing-plate F². A pin, F³, prevents the withdrawal of the swivel-shaft F', and its lower portion is held by the V-brace G, bolted to the under side of the tongue A, and having said shaft pass through a bearing at the V thereof. By means of said caster-wheels F the weight of the front portion of the rake-teeth, which comes upon the tongues A when said teeth are elevated, is supported entirely independent of the horses.

To prevent the pull which the levers B give to the beam R² at each angle-iron B' from springing said beam, I prolong each bolt L, which secures said angle-irons in place from said angle-irons down to the beam R', as shown in Fig. 4. About each of said bolts is a tube, P, nearly equal in length to the distance between the beams R' R². The diagonal brace-rods M, having the eyes M', through which pass said bolts, are fast at their lower ends to the straps E. In Fig. 1 only the bolt L shows.

I am aware that prior to my invention hay-rakes of substantially the same class as mine have been constructed with means for raising the points of the teeth. It is also old to use caster-wheels in connection with hay-rakes and to support harvester-tongues by means of caster-wheels.

What I claim as my invention, and for which I desire Letters Patent, is as follows, to wit:

1. The combination, with the hay-rake having tongues pivotally attached to the ends thereof, of the levers connected to the frame of said rake, and adapted to have their outer ends rest upon said tongues, and provided with means for raising their inner ends, for the purpose set forth.

2. The combination, with the hay-rake having tongues pivoted to its ends, of the levers pivotally connected to the frame of said rake and connected at their outer ends to said tongues, and the elbow-lever arranged to elevate the inner ends of said levers, substantially as and for the purpose set forth.

3. The combination, with the hay-rake having the tongues pivoted to its ends, of the levers B, centrally pivoted to the frame of the rake, and having their outer ends rest upon said tongues, the elbow-lever C, pivoted to said frame, and the links D, joining the short arm of said elbow-lever to the inner ends of said levers B, substantially as and for the purpose specified.

4. The combination, with the hay-rake and the tongues pivoted thereto and allowed a limited vertical play by means of the straps E, of the levers B, pivoted at an intermediate point of each to the angle-irons B', fast on the frame of the rake, and having their outer ends rest upon said tongues, the elbow-lever C, pivoted to the bearing-irons C², projecting rigidly from said frame, and the links D, joining the short end of said elbow-lever to the inner ends of said levers B, substantially as and for the purpose specified.

5. The combination, with the hay-rake having tongues pivoted to its ends, and provided with means for supporting the weight of the front portion of the rake-teeth from said tongues, of the caster-wheels swiveled to said tongues and adapted to uphold the same, for the purpose set forth.

6. The combination, with the hay-rake having tongues pivoted to the ends thereof, and provided with means whereby said tongues can support the front portion of the teeth of said rake, of the caster-wheels F, having vertical swivel-shafts F', the V braces G, secured to the under sides of said tongues, and having suitable bearings at their vertices for receiving said swivel-shafts, the bearing-plates F², secured to said tongues, for holding the upper ends of said swivel-shafts, and the pins F³, as and for the purpose specified.

7. The hay-rake having the tongues A pivoted to its ends and the caster-wheels F swiveled to said tongues and adapted to support the same, in combination with the levers B, pivoted to the frame of the rake and having their outer ends rest upon said tongues, and the elbow-lever C, pivoted to said frame and having its short arm joined to the inner ends of said levers B, substantially as and for the purpose specified.

8. The hay-rake consisting of the teeth T, parallel beams R R' R², and blocks U U' U', in combination with the tongues A, pivoted to said blocks U', the angle-irons B' and levers B, connected therewith, the prolonged bolts L, the tubes P, surrounding said bolts, and the brace-rods M, having eyes M', held by said bolts and tubes, and having their lower ends anchored at the ends of the beams R', as set forth.

9. The hay-rake consisting of teeth T T, parallel beams R R' R², blocks U U' U', the tongues A, pivoted at A' to the blocks U', the straps E, for laterally confining said tongues, and the draft-bars W, in combination with the caster-wheels F, having swivel-shafts F' and V braces G, for holding the same to the tongues, the levers B, pivotally connected to the rake-frame by the angle-irons B', and having their outer ends rest upon said tongues, and the elbow-lever C, having bearing-irons C², and links D, for connecting its short arm to the inner ends of the levers B, as set forth.

In testimony that I claim the foregoing as my invention I have hereunto set my hand this 27th day of May, A. D. 1885.

HORACE A. ALDEN.

In presence of—
  A. B. UPHAM,
  A. KEITHLEY.